United States Patent [19]

Sugawara

[11] Patent Number: 5,299,757
[45] Date of Patent: Apr. 5, 1994

[54] STOPPER APPARATUS FOR A SPINNING REEL

[75] Inventor: Kenichi Sugawara, Sakai, Japan
[73] Assignee: Shimano, Inc., Osaka, Japan
[21] Appl. No.: 881,500
[22] Filed: May 11, 1992
[30] Foreign Application Priority Data May 16, 1991 [JP] Japan ................. 3-34442[U]

[51] Int. Cl.⁵ ............................................ A01K 89/01
[52] U.S. Cl. ..................... 242/248; 242/307; 242/296
[58] Field of Search ............... 242/247, 248, 296, 307, 242/308

[56] References Cited

U.S. PATENT DOCUMENTS

| | | | |
|---|---|---|---|
| 2,862,679 | 12/1958 | Denison et al. | 242/247 |
| 4,477,038 | 10/1984 | Yorikane | 242/308 |
| 4,570,878 | 2/1986 | Nakajima | 242/307 X |
| 4,881,699 | 11/1989 | Emura | 242/248 |

Primary Examiner—Clifford D. Crowder
Assistant Examiner—John J. Calvert
Attorney, Agent, or Firm—Dickstein, Shapiro & Morin

[57] ABSTRACT

A stopper apparatus for a spinning reel includes a ratchet wheel mounted for unitary rotation on a sleeve shaft loosely fitted on a spool shaft, and a ratchet pawl engageable with the ratchet wheel. The ratchet wheel and pawl is switchable by a switching lever between an operative position to prevent a rotary frame from rotating in a line unwinding direction, while allowing the rotary frame to rotate in a line winding direction, and an inoperative position to allow the rotary frame to rotate in the line unwinding direction as well as the line winding direction. A resistor is connected to the switching lever to act on the rotary frame. When the switching lever is operated to switch the ratchet wheel and pawl to the operative position, the resistor is also switched to a position to apply a resistance to the rotary frame before the pawl fully engages the ratchet wheel.

8 Claims, 5 Drawing Sheets

STOPPER APPARATUS FOR A SPINNING REEL

BACKGROUND OF THE INVENTION

1. Field of the Invention

This invention relates to a stopper apparatus for a spinning reel, and more particularly to a stopper apparatus for a spinning reel having a stopper mechanism for preventing a rotary frame from rotating in a line unwinding direction, and allowing the rotary frame to rotate in a line winding direction, and a switching mechanism for switching the stopper mechanism between an operative position to prevent the rotary frame from rotating in the line unwinding direction, and allow the rotary frame to rotate in the line winding direction, and an inoperative position to allow the rotary frame to rotate in either direction.

2. Description of the Related Art

Conventionally, this type of stopper apparatus for a spinning reel has a stopper mechanism with only a minimum function satisfying the requirement to stop the rotary frame. Such a stopper mechanism, for example, includes a ratchet wheel forming part of a transmission line for driving the rotary frame, and a ratchet pawl for acting on the ratchet wheel. The ratchet pawl is engageable with a tooth of the ratchet wheel, thereby to apply a stopping force directly to the ratchet wheel.

Since the stopping force of the ratchet pawl directly acts on the ratchet wheel, the rotary frame is stopped with a shock. This could result in breaking of a fishing line, or escape of a fish having struck a bait. Further, since the ratchet pawl and ratchet wheel are subjected to strong shocks, a sufficient strength is required to withstand such shocks. To this end, the ratchet pawl and ratchet wheel must be either large in structure or formed of a strong material. This results in high manufacturing cost.

SUMMARY OF THE INVENTION

The object of the present invention is to provide a stopper apparatus for a spinning reel having an effective mechanism for acting on the transmission line for driving the rotary frame, thereby eliminating the disadvantage of the prior art noted above, the effective mechanism being readily switchable between an operative state and an inoperative state.

The above object is fulfilled, according to the present invention, by a stopper apparatus for a spinning reel comprising a resistor for acting on an engageable rotary member disposed in the transmission line for driving the rotary frame, wherein the resistor is switchable between an operative state to act on the engageable rotary member, and an inoperative state away from the engageable rotary member, and the switching mechanism is operatively connected to the resistor such that, when the switching mechanism is operated to switch the stopper mechanism to the operative position, the resistor is switched to the operative state, and when the switching mechanism is operated to switch the stopper mechanism to the inoperative position, the resistor is switched to the inoperative state.

The above stopper apparatus has the following functions and effects.

When the engageable rotary member rotates backward with the switching mechanism switched to the operative position, the resistor applies a resistance to the backward rotation of the engageable rotary member, thereby slowing down the rotary member, before the rotary member and rotary frame stop. When the engageable rotary member rotates in the line winding direction, the resistor applies no resistance thereto. When the switching mechanism is in the inoperative position, the resistor does not act on the engageable rotary member regardless of the direction in which the rotary member rotates.

Thus, when the engageable rotary member rotates backward, the resistor first applies a resistance to the engageable rotary member to slow down the rotary member, and then the switching mechanism becomes operative to stop the rotary member gently. The operative state of the resistor is automatically switchable with switching of the stopper mechanism.

The resistor is used in a limited way wherein its resistance is applied only when the engageable rotary member rotates backward. Consequently, a shock acting on the transmission line for driving the rotary frame is mitigated to reduce the possibilities of breaking of the fishing line and allowing fish to escape. The resistor is inoperative when the engageable rotary member rotates forward to take up the fishing line, to enable the rotary frame to rotate smoothly without the resistance. This produces the effect of allowing the angler to exert a reduced operating force to rotate the rotary frame. Further, since the resistor is automatically switchable between the operative state and inoperative state with operation of the switching mechanism, there is no necessity for the angler to remember to switch the resistor.

Other features and advantages of the invention will be apparent from the following description.

DETAILED DESCRIPTION OF THE PREFERRED EMBODIMENTS

A stopper apparatus for a spinning reel according to the present invention will be described in detail with reference to the drawings.

Figure 5:
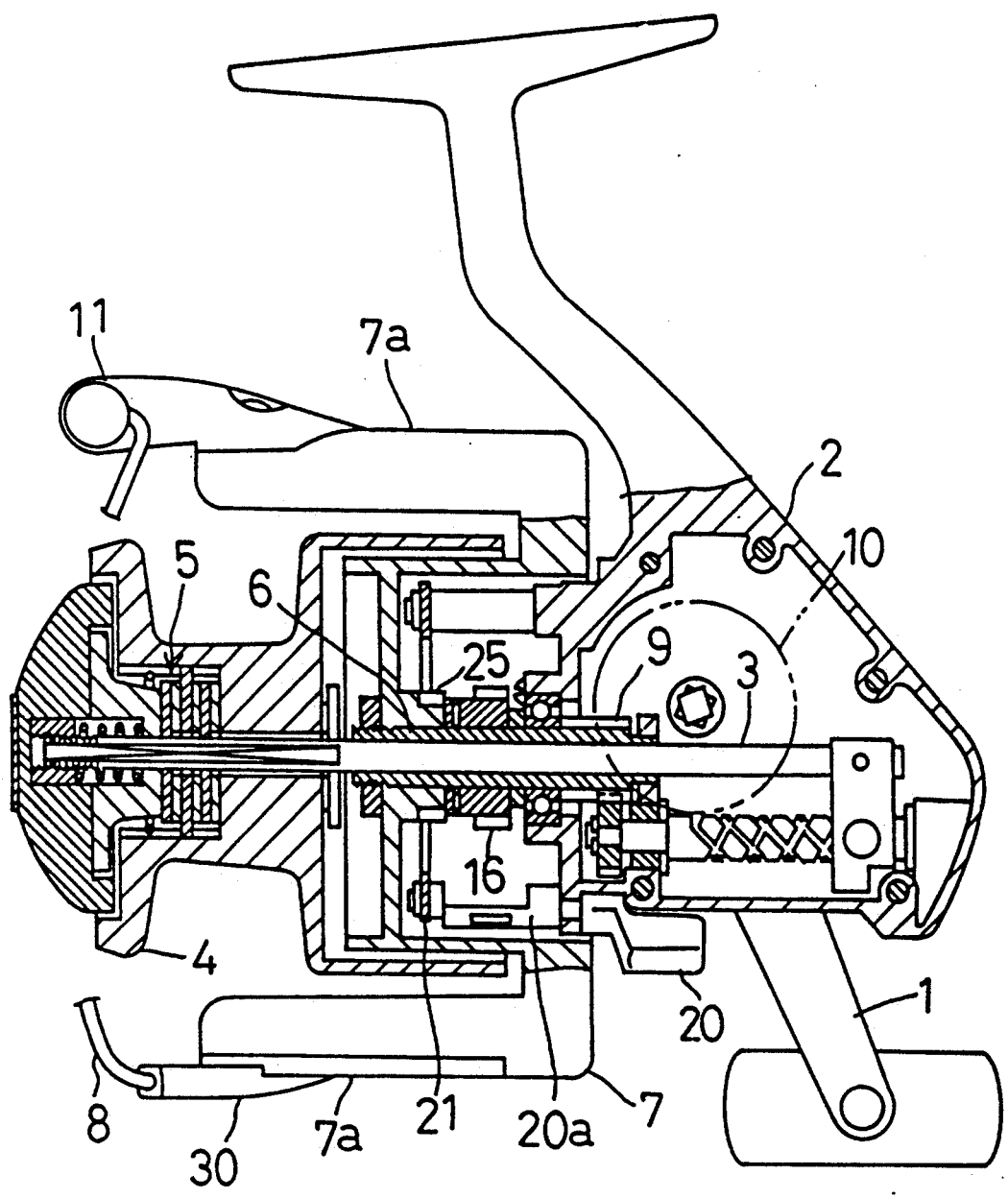
FIG. 5 is a side view of a spinning reel.

As shown in FIG. 5, this spinning reel includes a handle 1 attached to a reel body 2, a spool shaft 3 extending from the reel body 2, and a spool 4 rotatably mounted on the spool shaft 3. A drag device 5 is mounted between the spool shaft 3 and spool 4 to interconnect the spool shaft 3 and spool 4. A sleeve shaft 6 is rotatably mounted on a proximal portion of the spool shaft 3. The sleeve shaft 6 carries a rotary frame 7 rotatable with the sleeve shaft 6, and a pinion gear 9 formed on a portion of the sleeve shaft 6 lying inside the reel body 2. The pinion gear 9 is meshed with a main gear 10 mounted on a handle shaft, whereby turning of the handle 1 causes the rotary frame 4 to take a line winding action.

Figure 4:
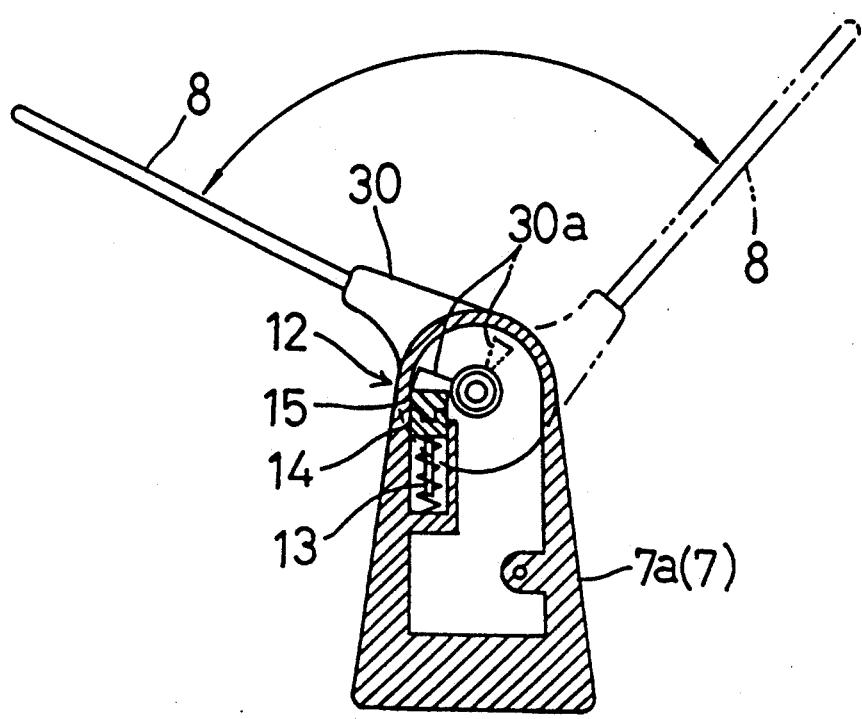
FIG. 4 is a bottom view of a support arm containing a buffer mechanism for mitigating a shock occurring when a bail arm is switched to a winding position.

A switching structure for switching positions of a bail arm 8 will be described next. One end of the bail arm 8 is connected to an arm cam 11 to be oscillatable therewith. The arm cam 11 is oscillatably supported on one of support arms 7a of the rotary frame 7. As shown in FIG. 4, the other end of the bail arm 8 is oscillatably connected to the other support arm 7a through an arm 30. Though not shown in the drawings, one of the support arms 7a contains a toggle mechanism in an interior space thereof for urging the bail arm 8 to a line winding position and a line releasing position. The other support arm 7a contains a buffer mechanism 12 for mitigating a shock occurring when the bail arm 8 is instantaneously switched from the line releasing position to the line winding position with turning of the handle 1. The buffer mechanism 12 includes an extendible and retractable pin 14, a spring 13 for urging the pin 14 to an extended position, and a rubber buffer 15 mounted on a forward end of the pin 14. The arm 30 has a projection 30a formed on a back surface thereof for contacting the rubber buffer 15, thereby to allow the bail arm 8 to be switched to the line winding position gently.

Figure 1:
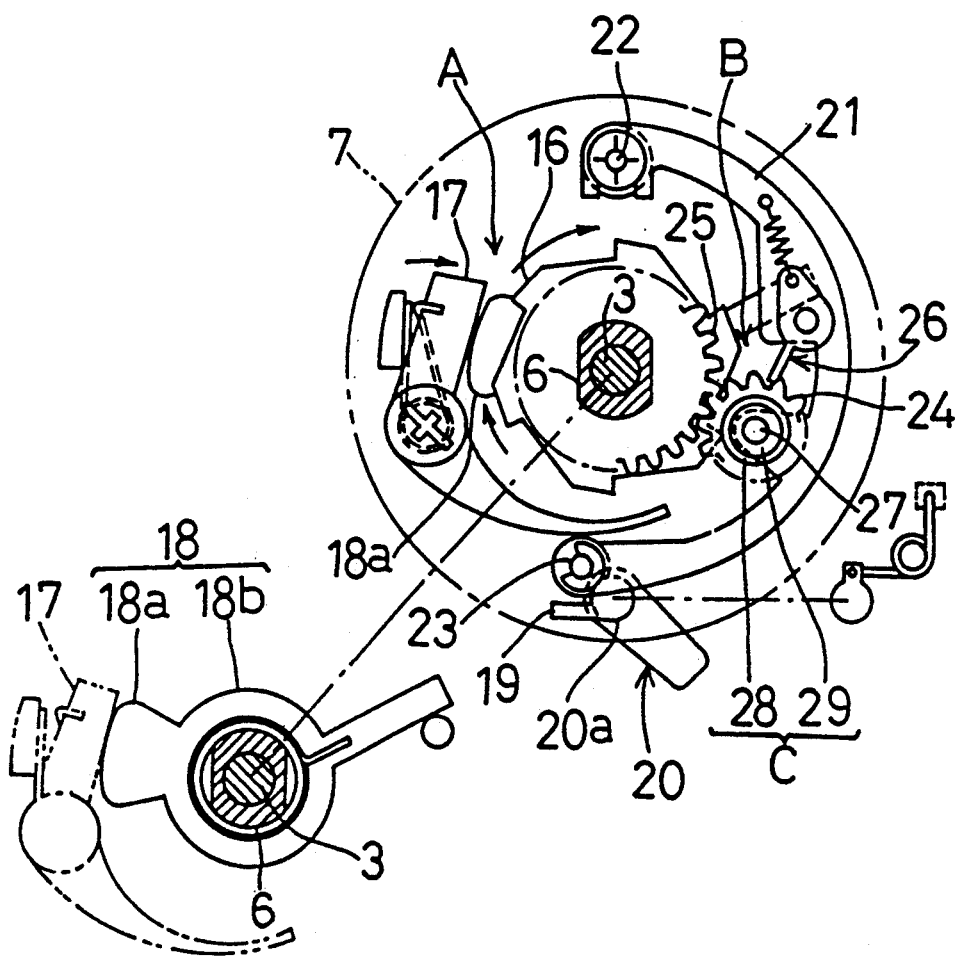
FIG. 1 is a front view of a stopper mechanism in an operative position with a resistor also in an operative position for winding a fishing line.
Figure 2:
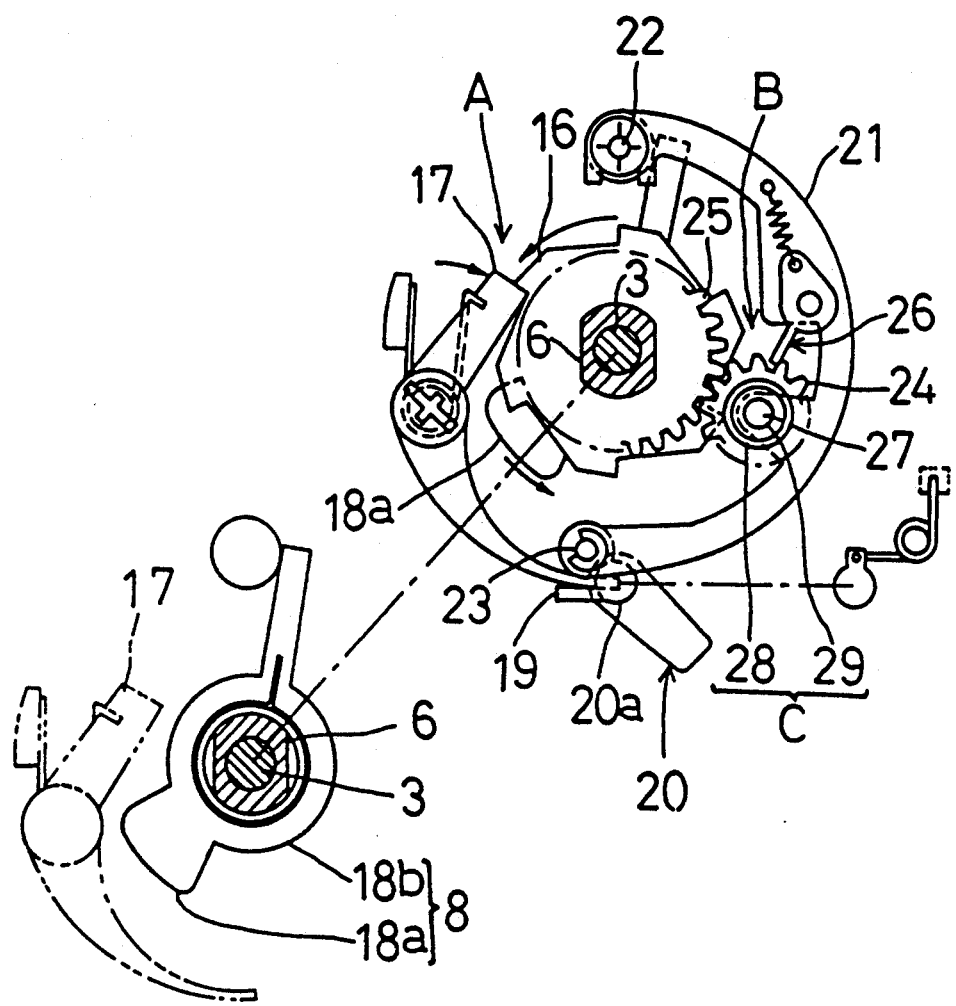
FIG. 2 is a front view of the stopper mechanism in the operative position with the resistor also in the operative position to perform a stopping function.
Figure 3:
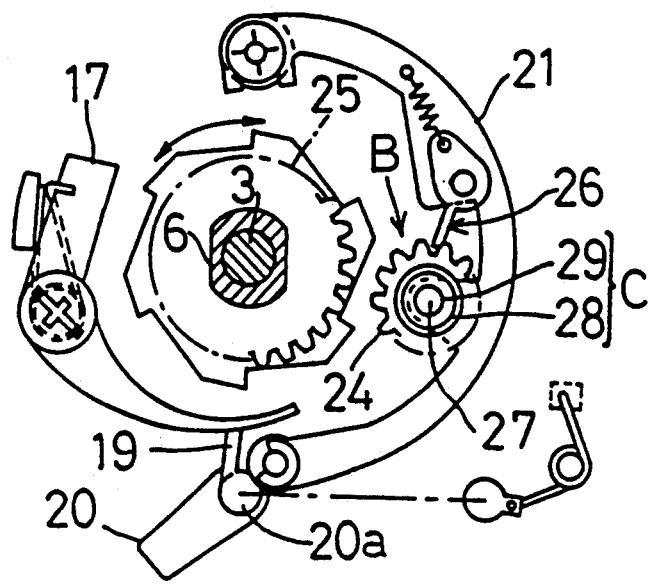
FIG. 3 is a front view of the stopper mechanism in an inoperative position with the resistor also in an inoperative position.

A stopper mechanism A for acting on the rotary frame 7 will be described next. As shown in FIGS. 1 through 3, the stopper mechanism A includes a ratchet wheel 16 mounted for unitary rotation on the sleeve shaft 6, and a ratchet pawl 17 engageable with the ratchet wheel 16. The ratchet pawl 17 is pivotable about an axis extending parallel to the spool shaft 3, and biased in a direction to engage the ratchet wheel 16. A cam element 18 is disposed adjacent the ratchet wheel 16. The cam element 18 has a large diameter portion 18a and a small diameter portion 18b formed peripherally thereof. The large diameter portion 18a raises the ratchet pawl 17 out of engagement with the ratchet wheel 16, while the small diameter portion 18b allows the ratchet pawl 17 to move into engagement with the ratchet wheel 16. The cam element 18 is rotatable with the ratchet wheel 16 only through a fixed angular range by means of a frictional retaining mechanism. The ratchet pawl 17 is raised when the rotary frame 7 rotates in a line winding direction, and lowered to the engaging position when the rotary frame 7 rotates in a line unwinding direction. A stopper lever 20 is attached to a bottom surface of the reel body 2 through a support axis 20a formed integral with the stopper lever 20. The support axis 20a extends to the vicinity of the ratchet wheel 16. The support axis 20a carries a switching cam 19 secured to a distal end thereof for pressing on one end of the ratchet pawl 17 to switch the ratchet pawl 17 to the disengaged position.

Thus, when the stopper lever 20 is moved in one direction as shown in FIG. 3, the switching cam 19 acts on the ratchet pawl 17 and switches the pawl 17 to the disengaged position. In this way, the stopper mechanism A is switchable to an inoperative position to allow the rotary frame 7 to rotate in either of the line winding direction or line unwinding direction.

When the stopper lever 20 is moved in the other direction as shown in FIGS. 1 and 2, the switching cam 19 moves away from the ratchet pawl 17, thereby allowing the pawl 17 to be switched to the engaging position. In this state, as shown in FIG. 2, the rotary frame 7 is prevented from rotating in the line unwinding direction. The stopper mechanism A may be switched to an operative position, as shown in FIG. 1, to allow the rotary frame 7 to rotate in the line winding direction. Thus, the stopper lever 20 acts as a switching mechanism.

A sound producing mechanism B will be described next. As shown in FIG. 5, the rotary frame 7 includes sound producing teeth 25 formed on a boss thereof extending inwardly. As shown in FIGS. 1 through 3, a bow-shaped movable member 21 is disposed outwardly of the sound producing teeth 25. The movable member 21 supports a sound producing gear 24 for engaging the sound producing teeth 25. One end of the movable member 21 is loosely fitted on a support pin 22 extending from a front face of the reel body 2, and the other end of the movable member 21 is relatively oscillatably supported on an arm 23 secured to the support axis 20a. When the stopper lever 20 is moved to the position as illustrated in FIG. 3, the stopper mechanism A is in the inoperative position, with the movable member 21 moved away from the sound producing teeth 25 to disengage the sound producing gear 24 from the sound producing teeth 25. When, in this state, the stopper lever 20 is switched, the stopper mechanism A becomes operative, with the movable member 21 moved toward the sound producing teeth 25 to engage the sound producing gear 24 and sound producing teeth 25. The movable member 21 oscillatably supports a sound producing piece 26 for engaging the sound producing gear 24. The sound producing piece 26 is snapped by the sound producing gear 24 to produce a clicking sound.

A resistor C for applying a resistance to backward rotation of the rotary frame 7 will be described next. As shown in FIGS. 1 through 3, the resistor C includes a one-way clutch 28 disposed between the sound producing gear 24 and a support axis 27 supporting the sound producing gear 24, and a frictional resistance element 29 disposed between the one-way clutch 28 and support axis 27. This resistor C applies the resistance when the rotary frame 7 rotates in the line unwinding direction, and does not apply the resistance when the rotary frame 7 rotates in the line winding direction. Consequently, when the rotary frame 7 is rotated backward, the resistor C applies the resistance before the ratchet pawl 17 fully engages the ratchet wheel 16, thereby to mitigate a shock occurring from the engagement.

Thus, when the stopper mechanism A is switched to the operative position, the sound producing gear 24 engages the sound producing teeth 25, and the resistor C becomes operative. When the stopper mechanism A is switched to the inoperative position, the resistor C becomes inoperative, the switching being automatically made only by operating the stopper lever 20.

Figure 6:
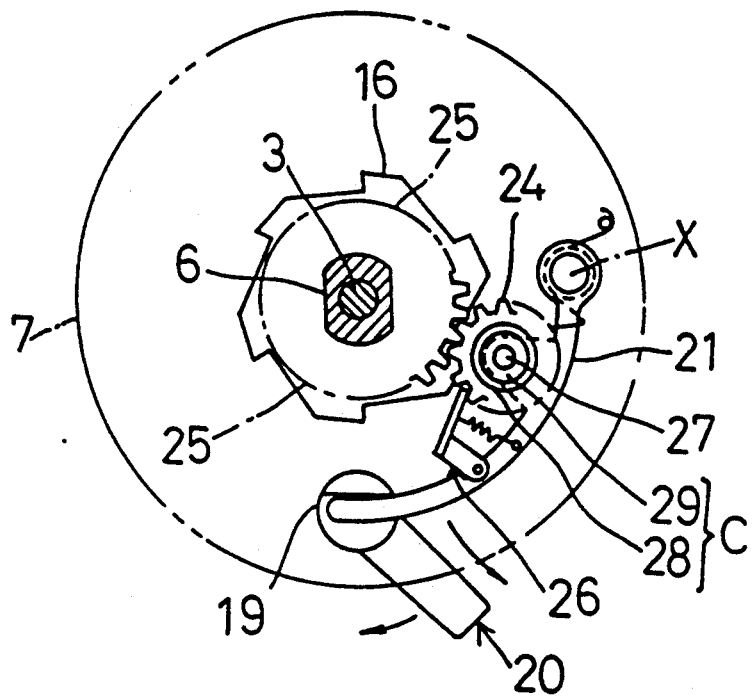
FIG. 6 is a front view of the resistor applied to a stopper mechanism in a different embodiment.

The above embodiment may be modified as follows:

(1) As shown in FIG. 6, the sound producing gear 24 may be supported on an arm-like movable member 21 vertically oscillatable about an axis X extending parallel to the spool shaft 3. In this case also, the resistor C is provided for the sound producing gear 24.

(2) The one-way clutch 28 may be in the form of a coil spring instead of being the bearing type.

What is claimed is:

1. A stopper apparatus for a spinning reel comprising:
   a stopper mechanism for preventing a rotary frame from rotating in a line unwinding direction, and allowing said rotary frame to rotate in a line winding direction;
   a switching mechanism for switching said stopper mechanism between an operative position to prevent said rotary frame from rotating in said line unwinding direction and allow said rotary frame to rotate in said line winding direction, and an inoperative position to allow said rotary frame to rotate in said line unwinding direction as well as said line winding direction; and a resistor for acting on an engaging rotary member disposed in a transmission line for driving said rotary frame to resist backward rotation of said engaging rotary member;

wherein said resistor is switchable between an operative state to act on said engageable rotary member, and an inoperative state away from said engageable rotary member; and said switching mechanism is operatively connected to said resistor such that, when said switching mechanism is operated to switch said stopper mechanism to said operative position, said resistor is switched to said operative state, and when said switching mechanism is operated to switch said stopper mechanism to said inoperative position, said resistor is switched to said inoperative state.

2. A stopper apparatus as claimed in claim 1, wherein said stopper mechanism includes a ratchet wheel mounted for unitary rotation on a sleeve shaft loosely fitted on a proximal region of a spool shaft, and a ratchet pawl engageable with said ratchet wheel.

3. A stopper apparatus as claimed in claim 1, wherein said switching mechanism is a stopper lever carrying a switching cam secured to a distal end thereof, said stopper lever being operable in one direction to move said switching cam away from said ratchet pawl to allow said ratchet pawl to engage said ratchet wheel, thereby preventing said rotary frame from rotating in said line unwinding direction.

4. A stopper apparatus as claimed in claim 1, wherein said resistor includes a one-way clutch disposed between a sound producing gear and a support axis for supporting said sound producing gear, and a frictional resistance element disposed between said one-way clutch and said support axis.

5. A stopper apparatus as claimed in claim 4, wherein said sound producing gear is engageable with sound producing teeth formed as said engageable rotary member on an inwardly extending boss of said rotary frame, to produce a clicking sound.

6. A stopper apparatus as claimed in claim 5, further comprising a movable member disposed outwardly of said sound producing teeth, said sound producing gear being supported on said movable member.

7. A stopper apparatus as claimed in claim 6, wherein said movable member is bow-shaped.

8. A stopper apparatus as claimed in claim 6, wherein said movable member is in form of an arm vertically oscillatable about an axis extending parallel to a spool shaft.

* * * * *